3,100,884
HIGH TEMPERATURE PRESSURE SENSITIVE SOLID STATE MATERIAL AND DEVICE
James W. Ballard, Dayton, Ohio, assignor to Systems Research Laboratories, Inc., Dayton, Ohio, a corporation of Ohio
Filed Dec. 20, 1960, Ser. No. 77,131
1 Claim. (Cl. 338—224)

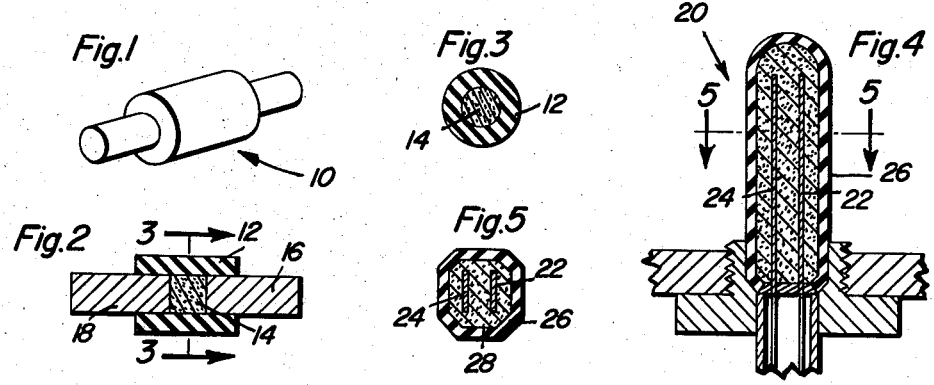
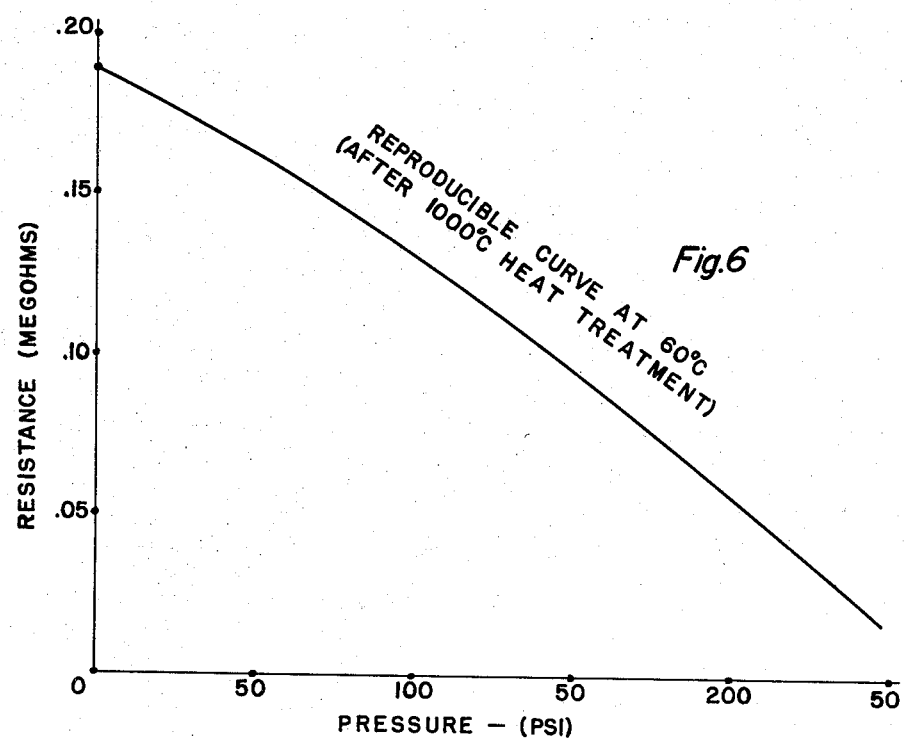

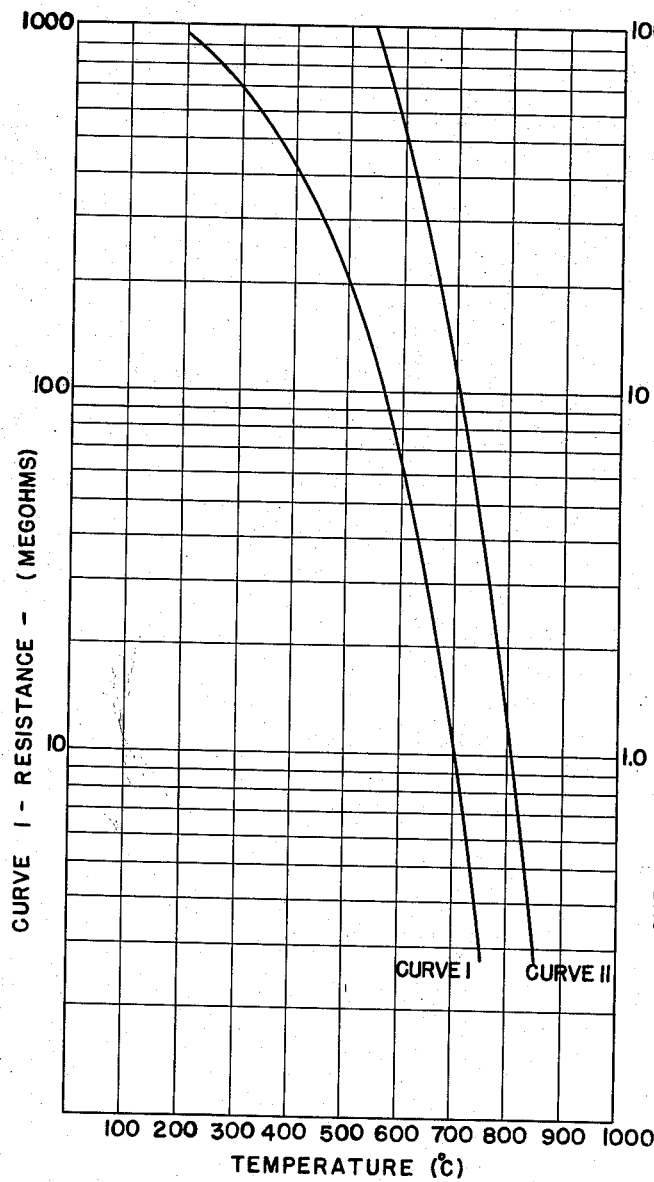

The present invention relates to a novel composition or material having useful electrical resistivity and other properties for use in devices which electrically sense and/or measure variable quantities such as pressure and temperature or may serve as means for compensating for pressure and temperature variations in electrical measuring and information telemetering equipment.

Electrical resistance materials, have heretofore been known to have resistance values which predictably vary with changes in pressure and temperature. However, the use of such resistance materials with variable resistance characteristics, have heretofore been restricted in use. Specifically, materials heretofore used were not capable of providing reproducible and predictable pressure, temperature and resistance response curves, nor able to operate within a wide range of temperatures and pressures nor provide the optimum range of resistance values necessary to provide measurements for the variable temperatures or pressures being sensed without complex compensating and correcting equipment. Furthermore, materials heretofore used were not operative within the elevated temperature ranges with which the present invention is concerned, without error-producing chemical and/or physical change of the properties of the resistance material. It is accordingly a primary object of this invention to provide an electrical resistance material having those attributes absent from the previous aforementioned materials.

Another further object of this invention is to provide a solid state material which will not only be operative within the wide temperature and pressure ranges as previously mentioned but will also enable construction of reliable measuring devices despite exposure to rapidly changing conditions of pressure and temperature.

An additional object of this invention is to provide a solid state resistance material composed of powdered components which retain their individual properties and do not sinter within the elevated temperature ranges within which the mixture material is designed to be exposed so that predictable and reproducible pressure sensing properties of the mixture may enable measurement of variable quantities by measurement of the electrical resistivity of the material.

A further object of this invention is to provide a solid state material which is composed of a non-sintered powder mixture of two components, one of which is a non-conductor and the other a conductor with the ratio of one component to the other being selected in order to provide the optimum pressure and resistance ranges for the response curve of the resulting mixture.

The novel material of this invention prepared and confined after being temperature aged, has been discovered to exhibit various unexpected but extremely useful properties including (1) pressure vs. resistance response characteristics which are reproducible; (2) ability to be tailored to accommodate specified or optimum resistance and pressure ranges by varying the proportions of the two powdered components making up the mixture; (3) exhibit negative temperature coefficient of resistance. Several advantages arise as a result of the exhibited properties and facilities provided by new mixture material. Some of the advantages include:

(1) Use for temperature compensation purposes because of the negative temperature coefficient of resistance over wide temperature ranges.

(2) Reliable sensing equipment may be made through use of the novel material because of its reproducible and predictable response qualities as aforementioned.

(3) The material is capable of performing its functions at elevated temperatures such as 1000° C.

(4) The material may perform its functions throughout wider ranges of temperature such as from —200° C. to 1000° C. and wider ranges of pressure such as 0 to 5000 p.s.i.

(5) The material will resist the effects of nuclear radiation including a dose rate of $10^{11}$ neutrons/cm.$^2$/sec. for 300 hours.

(6) The material provides a simple technique for the construction at a less expensive cost, of pressure or temperature sensing transducers and other equipment that may take advantage of the discovered properties thereof.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of an experimental installation for the solid state pressure sensitive material in pellet form.

FIGURE 2 is a longitudinal sectional view through the experimental device illustrated in FIGURE 1.

FIGURE 3 is a sectional view taken through a plane indicated by section line 3—3 in FIGURE 2.

FIGURE 4 is a sectional view taken through an exemplary transducer device utilizing the novel solid state pressure sensitive material of this invention.

FIGURE 5 is a sectional view taken through a plane indicated by section line 5—5 in FIGURE 4.

FIGURE 6 is a graph containing an exemplary reproducible resistance vs. pressure response curve of the material as measured in the device of FIGURES 1–3.

FIGURE 7 is a graph of the resistance vs. temperature characteristics of the novel solid state pressure sensitive material illustrating its negative temperature coefficient of resistance.

The major objectives to which the present invention is related involves the measurement of wide ranges of pressures such as 0 to 5000 p.s.i. over a large temperature range such as —200° C. to 1000° C. in an environment which may be subjected to nuclear radiation. Accordingly, a device capable of operating in a satisfactory manner within the wide pressure and temperature ranges as hereinbefore indicated and also capable of resisting nuclear radiation is made possible by virtue of the novel material of this invention.

The material of this invention therefore is composed of a mixture of two components. One component is a ceramic powder which is relatively non-conductive and has a high liquidus temperature and also is capable of resisting thermal shock. One example of such a ceramic powder component selected is alumina ($Al_2O_3$), which has a high electrical resistivity, resists thermal shock as well as nuclear radiation and has a liquidus temperature of 2050° C. Other requirements of the ceramic powder component are related to the selection of the other component of the mixture, namely, the temperature at which the non-conductive powder component will chemically react with the other component and the thermal coefficient of linear expansion of the two components. Alumina, for example, has a thermal coefficient of linear expansion of $3.85 \times 10^{-6}$ which must be taken into consideration when selecting the other component so that both components will have compatible thermal expansion properties.

The other component of the material is a conductive powder preferably a refractory metal which will not react with the non-conductive component as hereinbefore indicated at the elevated temperatures to which the material may be subjected. For example, one conductive metal powder selected was molybdenum which will not react with alumina below 1800° C. Also, the molybdenum metal has a thermal coefficient of linear expansion of $3.0 \times 10^{-6}$ which is accordingly close to and hence compatible with the expansion and contraction coefficient of the alumina material.

As a result of a selection as hereinabove indicated, of the two components forming the powder mixture, the mixture when compacted and reduced to proper particle size and temperature aged, will respond to variations in pressure applied to the material by variation in its electrical resistivity. Reference may therefore be made to FIGURES 1-3 which illustrate an experimental installation for the solid state material within the device generally referred to by reference numeral 10. The device 10 has therefore been used to apply pressure to the material and includes a ceramic cylinder 12 within which the solid state material of this invention is confined in pellet form. The size of the pellet referred to by reference numeral 14, to which pressure is applied by means of the elements 16 and 18, was arbitrarily chosen for experimental purposes. Accordingly, as seen in FIGURE 6 the solid state material after undergoing a 1000° C. heat treatment when installed in the transducer device 10 of FIGURES 1-3 exhibited a reproducible resistance vs. pressure response curve characteristic and was so operative within a range of 30,000 to 190,000 ohms resistance and 0 to 234 p.s.i. pressure at 60° C. The mixture of components utilized was molybdenum 30% and alumina 70% yielding the optimum resistance-pressure response curve illustrated in FIGURE 6. It has also been demonstrated that other proportions of the conductive and non-conductive components may be utilized to form a mixture yielding different resistance and pressure ranges. Also, materials other than alumina and molybdenum may obviously be selected as long as they have the comparable properties with respect to themselves and with respect to each other as hereinbefore indicated with regard to the alumina and molybdenum. For example, the non-conductive powder must have a high electrical resistivity, resist thermal shock and have a high liquidus temperature. The conductive material must be refractory and not react with the non-conductive material within the high temperature range and must have a lower electrical resistivity and its thermal coefficient of linear expansion must be compatable with that of the non-conductive material.

An additional useful property discovered for the material as prepared pursuant to this invention, was that the material exhibited a negative temperature coefficient of resistance over a wide temperature range. Attention is therefore invited toward FIGURE 7 which illustrates the aforesaid negative temperature coefficient of resistance for the same composition of the solid state material, namely 30% powdered molybdenum and 70% powdered alumina in pellet form within the transducer device 10. As shown in FIGURE 7, increase in temperature caused the unexpected decrease in resistance. The temperature range during which the material exhibited the negative coefficient of resistance was measured from 180° C. to 915° C. This latter property of the mixture as will be apparent to those skilled in the art is particularly useful when the mixture is associated with materials having positive temperature coefficients for purposes of minimizing temperature responsive variations in resistance or may itself be used for temperature compensating purposes in a transducer system.

From the foregoing, it will be appreciated that the novel material of the present invention will have wide utility in many different installations in which it is desirable to have a variable resistance which is a predictable and reproducible function of variable quanities being measured. Accordingly, in addition to use in a pressure measuring transducer, the material may also be used in a temperature sensing device. The material will be useful for example in a device to pulse an appropriate compensated electronic circuit for sensing temperature which would be advantageous over devices using thermocouples because of its simplicity and ability to better accommodate the relatively small requirements of electronic circuitry for read-out and telemeter information purposes. The material of this invention may also be useful for example as a dynamic senser in microphone devices capable of withstanding high temperatures. One particular installation for the material is illustrated in FIGURES 4 and 5. A pressure transducer 20 is shown which includes a pair of electrodes 22 and 24 disposed within a flexible envelope 26 within which the solid state material of this invention is confined. Accordingly, the envelope 26 when exposed to pressure will accordingly vary the resistivity of the solid state material 28 there within which may be measured by a current flow between the electrodes 22 and 24 providing a transducer device of extremely sensitive and yet simple and inexpensive construction.

This invention further contemplates the use of the solid state material in pellet form as illustrated in FIGURES 1-3 which exhibit negative temperature coefficients together with pellets formed of the conductive metallic component alone which has a positive temperature coefficient so as to provide a resistor material tailored to meet precise requirements. It will also be appreciated from the foregoing description, that the new solid state pressure sensitive material may be used at temperatures of 1000° C. and possibly 1800° C. when alumina and molybdenum are used as examples. The materials will also be resistant to nuclear radiation as hereinbefore mentioned. Also, pressure transducers utilizing the new soild state material may be produced which not only perform at 500° C. but also 1000° C. and hence operative in a wider range of temperatures. Furthermore, resistors may be formed from the new material of this invention and tailored for use in any desirable temperature and pressure range or tailored for use with minimum temperature resistance variations at a relatively low cost as compared to materials or devices capable of operating under comparable requirements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A pressure and temperature sensing transducer device comprising spaced electrode means, flexible envelop means defining an enclosed space within which said electrode means are disposed and a dry, solid state resistant material combined within said envelop means having variable electrical resistivity values which are predictable functions of temperature and pressure to which the material is exposed, said material consisting of a heat treated, non-sintered powder mixture of a relatively non-conductive component and a conductive component, said components having compatible thermal coefficients of linear expansion and wherein the mixture exhibits electrical resistivity properties which are a substantially reproducible function of pressure applied thereto, the non-conductive component being approximately 70% powdered alumina and the conductive component being approximately 30% powdered molybdenum.

(References on following page)

References Cited in the file of this patent

UNITED STATES PATENTS

| | | |
|---|---|---|
| 1,335,019 | Papini | Mar. 30, 1920 |
| 1,658,788 | Levy | Feb. 7, 1928 |
| 1,776,191 | Mucher | Sept. 16, 1930 |
| 2,624,822 | Becker | Jan. 6, 1953 |
| 2,740,030 | Quinn | Mar. 27, 1956 |
| 2,845,515 | Anderson et al. | July 29, 1958 |
| 2,855,491 | Navias | Oct. 7, 1958 |
| 2,916,460 | Beck | Dec. 8, 1959 |
| 3,009,886 | Wejnarth | Nov. 21, 1961 |